United States Patent [19]

Kemp

[11] 4,397,738
[45] Aug. 9, 1983

[54] PROCESS FOR THE SEPARATION OF PARTICULATE SOLIDS FROM VAPORS

[75] Inventor: Thomas L. Kemp, Elmhurst, Ill.

[73] Assignee: UOP Inc., Des Plaines, Ill.

[21] Appl. No.: 418,954

[22] Filed: Sep. 16, 1982

[51] Int. Cl.³ .................. C10G 11/18; F27B 15/00
[52] U.S. Cl. .................... 208/161; 208/153; 422/144
[58] Field of Search .............. 208/153, 161; 422/144

[56] References Cited

U.S. PATENT DOCUMENTS

| | | | |
|---|---|---|---|
| 2,698,672 | 1/1955 | Burnside et al. | 208/161 X |
| 3,785,962 | 1/1974 | Conner et al. | 208/164 |
| 4,097,243 | 6/1978 | Bartholic | 23/288 |
| 4,219,407 | 8/1980 | Haddad et al. | 208/151 |
| 4,295,961 | 10/1981 | Fahrig et al. | 208/161 |
| 4,313,910 | 2/1982 | Dries et al. | 422/147 |

FOREIGN PATENT DOCUMENTS 604334  8/1960  Canada .................. 208/153

Primary Examiner—Delbert E. Gantz
Assistant Examiner—Lance Johnson
Attorney, Agent, or Firm—James R. Hoatson, Jr.; Louis A. Morris; William H. Page, II

[57] ABSTRACT

A process and related apparatus for separating particulate solids from a stream comprising vapors and particulate solids passed in admixture through an elongated contacting zone. The stream is discharged at an angle to the vertical along the inside wall of a cylindrical disengagement zone. The solids separate due to centripetal acceleration and fall to the bottom of the disengagement zone.

7 Claims, 2 Drawing Figures

PROCESS FOR THE SEPARATION OF PARTICULATE SOLIDS FROM VAPORS

BACKGROUND OF THE INVENTION

1. Field of the Invention

The field of art to which this invention pertains is solids-vapors separation and more particularly the relationship between such separation and hydrocarbon processing. Specifically this invention relates to a fluidized catalytic cracking process in which the catalyst and oil are contacted for a certain period of time in a riser reaction zone and thereafter separated in a disengagement zone.

2. Prior Art

The prior art which is relevant to this invention can be found in classes covering fluidized conversion processing, and in particular fluidized catalytic cracking.

It is known in the art, that in certain instances, it is desired to substantially reduce the catalyst-oil contact times. Specifically, refiners have utilized riser cracking processes to eliminate the possibility of harmful secondary reactions which cause degradation of product quality. The solutions presented as can be seen in the patent art have centered around the use of cyclones connected to risers and the use of the so-called "quick quench" risers in which the riser outlets are designed or positioned so as to effect as rapidly and thoroughly as possible disengagement of the oil vapors from the catalyst. Examples of such patent art are U.S. Pat. Nos. 3,785,962 to Conner et al; 4,097,243 to Bartholic; 4,219,407 to Haddad et al; 4,295,961 to Fahrig et al; and 4,313,910 to Hubertus et al.

A recurring theme in the above patent art is for the vapor-particle stream flowing upward in the vertical riser to impinge on a surface opposing the upward flow and to be subjected to a 180° change in direction followed by discharge downward into a disengagement zone comprising a cylindrical chamber. The impinging surface may form a "T" shape with the riser with the flow splitting and flowing into opposite arms of the T and each arm of the T discharging downward.

The latter of the above references show the impinging surface to be a downwardly sloping curved surface or dual sloping curved surfaces forming a modified T shape with the riser which causes an abrupt change in direction of the riser stream from vertical upflow to horizontal flow and then to downflow thereby establishing a centrifugal movement of particle flow which concentrates the particles on the upper side of the surface. The particles and vapors are thus at least partially centrifugally separated and released into a disengagement space in which the vapors return upward and flow out through cyclonic separators while the particles fall into a dense bed at the bottom of the disengagement zone. There is still, in the prior art designs, a degree of undesirable contact and remixing of the particles and vapors in the disengagement zone.

I have discovered a modification to the above downward sloping impinging surface or surfaces which has an amazing positive effect on the disengagement efficiency.

SUMMARY OF THE INVENTION

In brief summary my invention is, in one embodiment, a process for separating particulate solids from a stream comprising vapors and particulate solids passed in admixture through an elongated contacting zone. The process comprises discharging the stream from the contacting zone into a disengagement zone. The disengagement zone has an interior cylindrical surface, the cylindrical axis of which is substantially vertical. The direction of flow of the stream is altered upon the discharge of the stream from the contacting zone so as to effect the flow of the stream to be in a downward direction along the curvature of the interior surface and at a positive angle to the vertical. The solids thereby fall to a bottom portion of the disengagement zone and the vapors rise to an upper portion thereof.

In another embodiment, my invention is an apparatus useful for separating particulate solids from a stream comprising vapors and particulate solids in admixture. The apparatus comprises in combination: (a) a riser conduit having a discharge opening through which the stream may pass; (b) a cylindrical vessel containing the discharge opening, the cylindrical axis of the vessel being vertical; (c) a deflecting means comprising a curved surface juxtaposed with respect to the discharge opening such that the stream passing from the discharge opening is deflected in a downward direction along the curvature of the interior surface of the vessel at a positive angle to the vertical.

Other embodiments and objects of my invention encompass further details such as the function and arrangement of various components of my apparatus all of which are hereinafter disclosed in the following discussion of each of these facets of my invention.

DESCRIPTION OF THE INVENTION

Figures 1, 2:
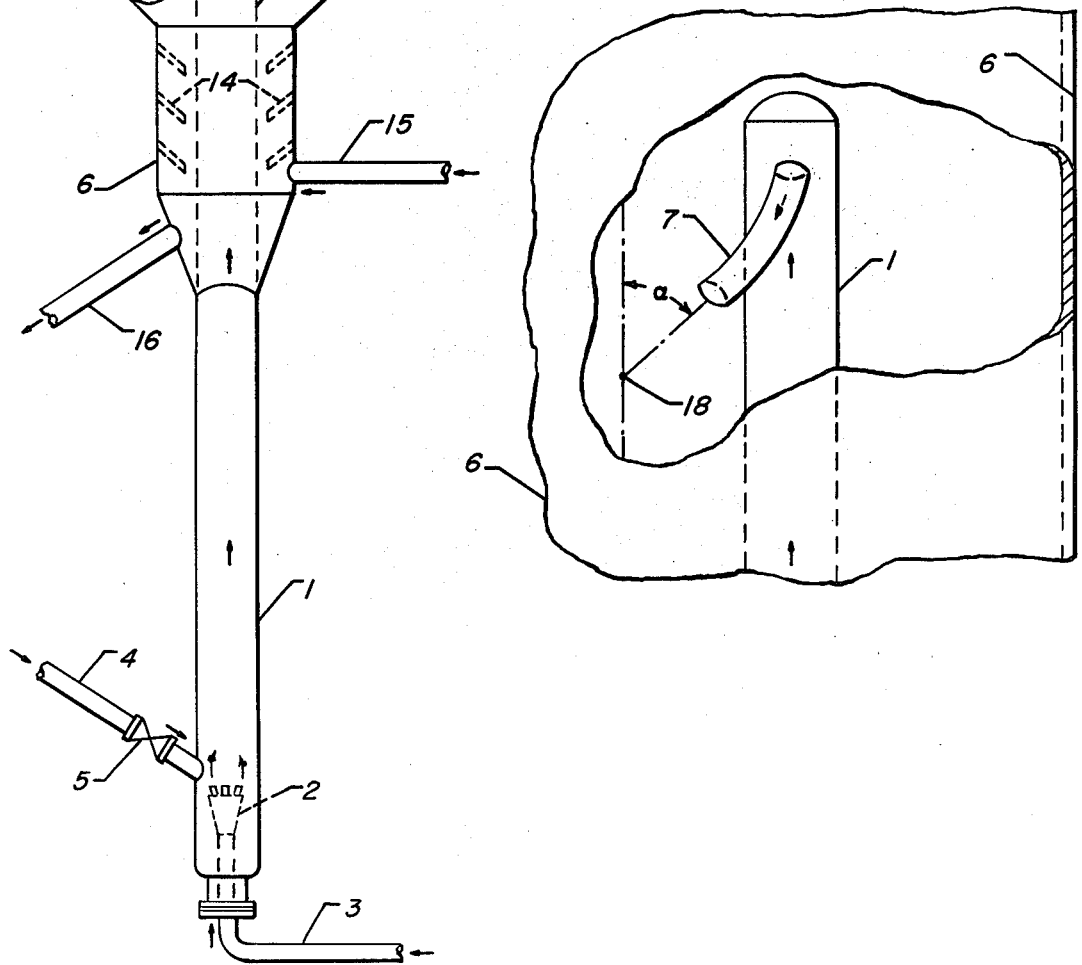
FIG. 1 is a side view of a fluid catalytic cracking apparatus employing the present invention.
FIG. 2 is a cutaway view of a portion of the apparatus shown in FIG. 1 rotated 90° so as to clearly show the critical features of the present invention.

A particular environment wherein the present invention finds its greatest utility is in a fluid catalytic cracking apparatus shown in FIG. 1 and comprising a riser reactor conduit 1, a feed distributor 2, a hydrocarbon inlet means 3, a regenerated-catalyst inlet means 4, a cylindrical disengagement vessel 6, a cyclone separation means 12, and a spent-catalyst outlet means 16. A hydrocarbon feed, for example, a virgin gas oil boiling within the range of from about 650° F. to about 1200° F., is introduced into the apparatus by way of hydrocarbon-feed inlet means 3. The hydrocarbon feed may be preheated by a fired heater (not shown) or by a system of heat exchangers (not shown) before entering the unit and it is to be understood that recycle streams may also be charged in conjunction with the virgin feed into the unit. The hydrocarbon feed may be in vapor phase or in liquid phase or a mixture of the two but more typically in fluid catalytic cracking process it will be in the liquid phase. Hydrocarbon feed inlet means 3 is connected to hydrocarbon feed distributor 2 through which hydrocarbon feed passes and becomes mixed in the lower portion of conduit 1 with hot regenerated catalyst from a regeneration zone (not shown) which enters conduit 1 through regenerated catalyst inlet means 4 which has flow regulating means 5 located thereon to control the flow of regenerated catalyst. Essentially complete vaporization of the hydrocarbon feed occurs rapidly and conversion of the feed at conversion conditions, including the presence of regenerated catalyst, takes place as the mixture passes upward through conduit 1 which extends vertically upward through the bottom portion of disengagement vessel 6 into disengaging space 8 within disengagement vessel 6. Reaction products plus unconverted feed, if any, pass out of conduit 1 via arms 7 located at the upper end of conduit 1 into disengaging zone 8 within disengagement vessel 6. Separation of hydrocarbon vapors and catalysts occurs within disengaging space 6. Separated spent catalyst drops down into dense bed 10 which has an interface shown at 9. Hydrocarbon vapors and any inerts plus any entrained catalyst in disengaging space 8 enter cyclone separation means 12 through inlet 11 and catalyst and vapors are again separated with separated catalyst passing downward toward dense bed 10 through dip leg 13 and vapor passing out of cyclone separator device 12 and out of vessel 6 through vapor conduit 17. Although FIG. 1 shows only one cyclone separation device 12, more than one such device could of course be employed in parallel or series flow arrangements as the volume and loading of the vapor stream and the desired degree of separation dictate. Catalyst in dense bed 10 flows in a downward direction and passes through a lower necked-down section of vessel 6 over baffles 14 and is stripped of absorbed and interstitial hydrocarbons by a countercurrent stream of stripping medium, generally steam, which enters the lower portion of vessel 6 through stripping medium inlet means 15. Spent catalyst leaves vessel 6 through spent-catalyst conduit 16 and passes to a regeneration apparatus (not shown) wherein coke is oxidized from spent catalyst to produce regenerated catalyst.

The disengagement zone generally contains two phases. Typically there is what is referred to in the art as the dilute phase portion (less than about 30 lb/ft$^3$) which is the upper volume within the disengagement zone and the dense phase portion (greater than about 30 lb/ft$^3$) which is in the lower portion of the zone. The dense phase portion contains a fluidized bed of partially deactivated catalyst. Since in most instances there is no hydrocarbon other than stripping gas which passes through this fluidized bed, the catalyst is not entrained but remains within the confines of the bed. The separation effected by the present invention occurs in the dilute phase.

Arms 7, which receive the streams discharged from the openings from conduit 1 into disengagement zone 8, incorporate the essential feature of the present invention comprising the downwardly sloping and vertically angled impingement surface. Arms 7 need not be closed conduits, i.e. they need only be curved surfaces having sufficient area to contact and deflect substantially all of the discharged catalyst. As the catalyst-vapor stream flows along or through arms 7 it will be deflected downwardly and at an angle to the vertical so that it will impinge on the inner cylindrical surface of vessel 6 downwardly and at an angle to the vertical. A large portion of the vapor will separate from the catalyst as the stream flows along or through and is discharged from arms 7. However, in contradistinction to the above discussed prior art, the present invention will achieve even further vapor-catalyst separation by the centrifugal forces exerted on the catalyst as it flows around the circumference of the inner surface of vessel 6 which it will do because of the degree of horizontal momentum imparted to it by arms 7.

As previously mentioned, all of the above separation effects occur best in a dilute phase. One reason is that the hydrocarbon vapor-catalyst contact need be minimized to avoid undesired reactions, and there is a far higher degree of contact in dense phase as compared to dilute phase. Another reason is that as high a velocity as possible of the stream striking the inner wall of the disengagement zone is desirable to maximize the centripetal acceleration effects, and such velocity would be quickly lost if the stream had to flow through a dense phase. Arms 7, therefore, should be of sufficient height above interface 9 to enable the full advantageous effect of the present invention.

With further reference to FIG. 2, the view of one of the arms 7 is such that the twist of the arm with respect to the vertical may be observed. Angle $\alpha$ may be defined as the angle to the vertical of a line formed by the intersection of two planes, a first plane which is tangent to the inside surface of vessel 6 at the point of impingement 18 of the stream from arm 7, and a second plane which is perpendicular to the first plane and which substantially contains the line defined by the direction of flow of the stream from arm 7 to the inside surface (the line will be slightly curved due to the acceleration of gravity). Angle is measured to the vertical in the first plane. The preferred $\alpha$ would be from about 15° to about 45° for significant advantageous effects.

Riser or contacting zone 1 is shown in the figures in a preferred embodiment as substantially axial to the cylindrical axis of disengagement vessel 6 with at least two arms evenly spaced around the end of the riser in a horizontal plane, i.e. 180° apart in the two arm configuration shown. If there were, e.g., three arms, they would be 120° apart. The respective directions of flow of the streams from each of the multiple arms along the interior surface of disengagement vessel 6 would be downward and outward in a substantially helical orientation.

EXAMPLE

The present invention was tested and compared to prior art designs in a small scale plastic model of FCC reactor internals corresponding to the above preferred configuration as shown in the figures. The prior art configuration and embodiment of the present invention tested differed only in that the downward sloping curved arms of the former were twisted (in a clockwise direction looking from above) to arrive at the latter. The amount of twisting was such as to effect an angle $\alpha$, as defined above, of 15° for a catalyst-air stream leaving the arms and impinging on the inside surface of a cylindrical vessel comprising a disengagement zone. The catalyst-air stream was used to simulate flow through the reactor of a commercial FCC unit. Other relevant details of the model as compared to a typical commercial unit were as follows:

|  | Model | Commercial |
|---|---|---|
| Riser Velocity, ft/sec | 50 | 70 |
| Riser Density, lbs/ft$^3$ | 2.4 | 2.4 |
| Riser Flux, lbs/ft$^2$-sec | 28 | 164 |
| Rx Dilute Velocity, ft/sec | 5.8 | 6 |

The results showed a disengagement efficiency for the design incorporating the present invention of 90% as compared to the prior art standard "T" design of 79%. A recent commercial installation, also using the standard "T" design, also exhibits a disengagement efficiency of 79%. Since the effect of greater riser velocity and flux (the conditions differing significantly between the model and commercial installation) on disengagement efficiency appears to be negligible, the design of the present invention on a commercial scale would also appear to be able to achieve a disengagement efficiency of 90%. The effectiveness of the present invention is thus clearly illustrated.

I claim as my invention:

1. A process for separating particulate solids from a stream comprising vapors and particulate solids passed in admixture through a vertically elongated contacting zone, which process comprises discharging said stream from said contacting zone into the main body of a disengagement zone, said disengagement zone having an interior cylindrical surface, the cylindrical axis of which is substantially vertical, altering the direction of flow of said stream upon the discharge of said stream from said contacting zone so as to effect the flow of said stream to be in a downward direction along the curvature of said interior surface and at a positive angle to the vertical, said stream having a downward progression while maintaining a helical twist of a vertical axis, whereby said solids fall to a bottom portion of said disengagement zone and said vapors rise to an upper portion thereof.

2. The process of claim 1 wherein said angle to the vertical is from about 15° to about 45°.

3. The process of claim 1 wherein said contacting zone is substantially axial to said cylindrical axis of said interior surface, said contacting zone having at least two discharge outlets evenly spaced around said contacting zone in a horizontal plane, the respective direction of flow of the streams from each said discharge outlet along said interior surface of said disengagement zone being in substantially helical orientation.

4. The process of claim 1 wherein said process comprises a catalytic cracking process in which said elongated contacting zone comprises a reactor riser, said particulate solids comprise catalyst, said vapors comprise hydrocarbons and said process comprises a fluid catalytic cracking process.

5. An apparatus useful for separating particulate solids from a stream comprising vapors and particulate solids in admixture, said apparatus comprising in combination;
   (a) a vertical riser conduit having a discharge opening through which said stream may pass;
   (b) a cylindrical vessel containing said discharge opening, the cylindrical axis of said vessel being vertical and said opening discharging into the main body of the vessel;
   (c) a deflecting means comprising a curved surface juxtaposed with respect to said discharge opening such that said stream passing from said discharge opening is deflected in a downward direction along the curvature of the interior surface of said vessel at a positive angle to the vertical, said deflecting means providing a downward progression to said stream while maintaining a helical twist of a vertical axis.

6. The apparatus of claim 5 wherein said angle to the vertical is from about 15° to about 45°.

7. The apparatus of claim 5 wherein said riser conduit is substantially axial to said cylindrical axis of said cylindrical vessel, there being at least two discharge openings in said riser conduit evenly spaced around said conduit in a horizontal plane, the respective deflecting means juxtaposed with each of said discharge openings being orientated to effect the respective directions of flow of the streams from each said discharge opening along said interior surface of said vessel to be in substantially helical orientation.

* * * * *